United States Patent
Inoue et al.

(10) Patent No.: US 11,565,207 B2
(45) Date of Patent: Jan. 31, 2023

(54) OIL SEPARATOR

(71) Applicant: DAIKIN INDUSTRIES, LTD., Osaka (JP)

(72) Inventors: Takashi Inoue, Osaka (JP); Harunori Miyamura, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 404 days.

(21) Appl. No.: 16/650,777

(22) PCT Filed: Jul. 30, 2018

(86) PCT No.: PCT/JP2018/028364
§ 371 (c)(1),
(2) Date: Mar. 25, 2020

(87) PCT Pub. No.: WO2019/064883
PCT Pub. Date: Apr. 4, 2019

(65) Prior Publication Data
US 2020/0238207 A1     Jul. 30, 2020

(30) Foreign Application Priority Data
Sep. 29, 2017   (JP) .............................. JP2017-190267

(51) Int. Cl.
| | | |
|---|---|---|
| *B01D 45/12* | (2006.01) |
| *B04C 5/04* | (2006.01) |
| *B04C 5/08* | (2006.01) |
| *F04C 29/02* | (2006.01) |
| *F25B 43/02* | (2006.01) |

(52) U.S. Cl.
CPC ................ *B01D 45/12* (2013.01); *B04C 5/04* (2013.01); *B04C 5/08* (2013.01); *F04C 29/02* (2013.01); *F25B 43/02* (2013.01)

(58) Field of Classification Search
CPC .. B01D 45/12; B04C 5/04; B04C 5/08; F04C 29/02; F25B 43/02
See application file for complete search history.

(56) References Cited

U.S. PATENT DOCUMENTS
| | | |
|---|---|---|
| 2,786,547 A | 4/1954 | McCartney |
| 2002/0054823 A1 | 5/2002 | Hida et al. |
| 2016/0231038 A1 | 8/2016 | Ozu et al. |

(Continued)

FOREIGN PATENT DOCUMENTS
| | | |
|---|---|---|
| CN | 1353249 A | 6/2002 |
| JP | 11-248296 A | 9/1999 |
| JP | 2016-511810 A | 4/2016 |

(Continued)

OTHER PUBLICATIONS
International Preliminary Report of corresponding PCT Application No. PCT/JP2018/028364 dated Mar. 31, 2020.

(Continued)

*Primary Examiner* — Andrew A Horton
(74) *Attorney, Agent, or Firm* — Global IP Counselors, LLP

(57) ABSTRACT

A centrifugal-separation type oil separator includes a cylindrical separator body, and an inflow pipe arranged to introduce a fluid including an oil into the separator body. The inflow pipe includes a curved portion. The curved portion includes at least one oil draining hole.

16 Claims, 15 Drawing Sheets

(56) References Cited

U.S. PATENT DOCUMENTS

2016/0313038 A1 10/2016 Young et al.
2017/0184086 A1* 6/2017 Scancarello ........ F04C 18/0215

FOREIGN PATENT DOCUMENTS

JP 2017-503989 A 2/2017
KR 10-2013-0032682 A 4/2013

OTHER PUBLICATIONS

European Search Report of corresponding EP Application No. 18 86 2090.0 dated Apr. 6, 2021.
International Search Report of corresponding PCT Application No. PCT/JP2018/028364 dated Sep. 18, 2018.
Munehisa Hayashi, "Inorganic Nonmetallic Materials Technology" 4th edition; pp. 140-142; Wuhan Science and Technology University Publishing Co. Ltd., 2014.

* cited by examiner

OIL SEPARATOR

CROSS-REFERENCE TO RELATED APPLICATIONS

This U.S. National stage application claims priority under 35 U.S.C. § 119(a) to Japanese Patent Application No. 2017-190267, filed in Japan on Sep. 29, 2017, the entire contents of which are hereby incorporated herein by reference.

BACKGROUND

Field of the Invention

The present invention relates to an oil separator of a centrifugal-separation type.

Background Information

The oil separator disclosed in Japanese Unexamined Patent Application Publication No. 2017-503989 includes an inflow pipe including a curved portion. In the curved portion, an oil in a fluid is separated by a centrifugal force. Then, the fluid flows into a separator body. In the separator body, an oil in the fluid is further separated by a centrifugal force generated by a swirling flow (refer to FIG. 3 in Japanese Unexamined Patent Application Publication No. 2017-503989, for example).

SUMMARY

In a curved portion such as that described above, an oil is separated by a centrifugal force, and tiny oil droplets gather together. There is, however, a possibility of the separated and collected oil becoming fine oil droplets and dispersing again, for example, when the flow rate of the fluid flowing in the curved portion increases. There is also a possibility of the oil separated in the curved portion becoming fine oil droplets and dispersing again by being caused to disperse when flowing into the separator body. The oil thus dispersing again after being intentionally separated in the curved portion causes a decrease in oil separation efficiency.

An object of the present invention is to suppress an oil separated in a curved portion from dispersing again.

According to a first aspect, an oil separator of a centrifugal-separation type includes a cylindrical separator body (70); and an inflow pipe (50) that introduces a fluid including an oil into the separator body (70) and that includes a curved portion (60). The curved portion (60) includes at least one oil draining hole (90).

In the first aspect, it is possible to discharge an oil separated in the curved portion (60) to the outside of the curved portion (60) through the oil draining hole (90). Accordingly, the oil separated in the curved portion (60) is enabled to be suppressed from dispersing again.

According to a second aspect, in the oil separator of the first aspect, the oil draining hole (90) is disposed in an outer circumferential portion (64) of the curved portion (60).

In the second aspect, forming the oil draining hole (90) in the outer circumferential portion (64) of the curved portion (60) makes it easy to guide an oil into the oil draining hole (90).

According to a third aspect, in the oil separator of the first or second aspect, the oil draining hole (90) is disposed in a lower-side portion (65) on a lower side of an axial center of the curved portion (60).

In the third aspect, forming the oil draining hole (90) in the lower-side portion (65) of the curved portion (60) makes it easy to guide an oil into the oil draining hole (90).

According to a fourth aspect, in the oil separator of any one of the first to third aspects, the curved portion (60) includes a plurality of the oil draining holes (90) arrayed in a flowing direction of the fluid.

In the fourth aspect, it is possible to discharge an oil separated in the curved portion (60) to the outside of the curved portion (60) through the plurality of oil draining hole (90) arrayed in the flowing direction of the fluid.

According to a fifth aspect, in the oil separator of the fourth aspect, opening areas of the plurality of oil draining holes (90) become smaller toward a downstream side.

In the fifth aspect, the opening area of the plurality of oil draining holes (90) corresponds to the size of an oil to be separated in the curved portion (60), which makes it easy to introduce the oil into the oil draining holes (90).

According to a sixth aspect, in the oil separator of the fourth or fifth aspect, the plurality of oil draining holes (90) differ from each other in terms of an angular position about an axis of the inflow pipe (50).

In the sixth aspect, even when a separated oil is distributed widely in the circumferential direction, the oil is enabled to be introduced into the plurality of oil draining holes (90).

According to a seventh aspect, in the oil separator of any one of the first to third aspect, the oil draining hole (90) is a slit (95) extending in a flowing direction of the fluid.

In the seventh aspect, the oil separated in the curved portion (60) is enabled to be discharged to the outside of the curved portion (60) through the slit (95).

According to an eighth aspect, in the oil separator of the seventh aspect, an opening width of the slit (95) decreases toward a downstream side.

In the eighth aspect, the opening width of the slit (95) corresponds to the size of an oil to be separated in the curved portion (60), which makes it easy to introduce the oil into the oil draining holes (90).

According to a ninth aspect, in the oil separator of any one of the first to eighth aspects, the curved portion (60) has an inner surface (61a) having a shape tapered toward an outer side in a radial direction, and the oil draining hole (90) is disposed in a front end portion (67) of the inner surface (61a).

In the ninth aspect, an oil separated by a centrifugal force is enabled to be collected at the front end portion (67) of the inner surface (61a) having the tapered shape. It is possible to discharge the oil to the outside of the curved portion (60) through the oil draining hole (90).

According to a tenth aspect, in the oil separator of any one of the first to ninth aspects, the oil separator further includes an oil passage (92) that enables the oil draining hole (90) and an oil reservoir (74) of the separator body (70) to be in communication with each other.

In the tenth aspect, the oil discharged through the oil draining hole is enabled to be sent into the oil reservoir (74) of the separator body (70).

According to an eleventh aspect, in the oil separator of the tenth aspect, the oil separator further includes an inner cylinder (82) disposed at a center inside the separator body (70) and having a lower end that includes an inflow port (85) for the fluid. An outflow opening (93) of the oil passage (92) is positioned on a lower side of the inflow port (51a) of the inner cylinder (82) and on an outer side of the inflow port (85).

In the eleventh aspect, the oil sent from the oil passage (92) into the oil reservoir (74) is enabled to be suppressed from being caught by a fluid flowing into the inner cylinder (82).

According to a twelfth aspect, in the oil separator of the tenth aspect, the oil separator further includes: an inner cylinder (82) disposed at a center inside the separator body (70) and having a lower end that includes an inflow port (85) for the fluid; and a separation plate (76) disposed between a bottom portion (72) of the separator body (70) and the inner cylinder (82). An outflow opening (93) of the oil passage (92) is positioned on a lower side of the separation plate (76).

In the twelfth aspect, the oil sent from the oil passage (92) into the oil reservoir (74) is enabled by the separation plate (76) to be suppressed from being caught by the fluid flowing into the inner cylinder (82).

According to a thirteenth aspect, in the oil separator of any one of the tenth to twelfth aspects, an outflow opening (93) of the oil passage (92) is disposed in a peripheral wall (71) of the separator body (70).

In the thirteenth aspect, the oil sent from the oil passage (92) into the oil reservoir (74) is enabled to be suppressed from being caught by the fluid flowing into the inner cylinder (82).

According to a fourteenth aspect, in the oil separator of any one of the tenth to thirteenth aspects, an outflow opening (93) of the oil passage (92) opens in a direction along a tangent of an inner circumferential surface (71a) of the separator body (70).

In the fourteenth aspect, the oil sent from the oil passage (92) into the oil reservoir (74) is enabled to be suppressed from being caught by the fluid flowing into the inner cylinder (82).

According to a fifteenth aspect, a compressor includes: an electric motor (20); a drive shaft (23) configured to be driven to rotate by the electric motor (20); a bearing (24, 25) that supports the drive shaft (23); and a compression mechanism (30) that is coupled to the drive shaft (23) and that compresses a fluid. The compressor includes the oil separator (40) of any one of the first to fourteenth aspects.

According to a sixteenth aspect, in the compressor of the fifteenth aspect, the compressor further includes an oil introduction path (17) that send an oil that has flowed out through the oil draining hole (90) to at least one of the compression mechanism (30) and the bearing (24, 25).

In the sixteenth aspect, it is possible to utilize the oil discharged through the oil draining hole (90) for lubrication of slidable portions of the compression mechanism (30) and the bearing (24, 25).

DETAILED DESCRIPTION OF EMBODIMENT(S)

Hereinafter, embodiments of the present invention will be described with reference to the drawings. The following embodiments are fundamentally presented as preferable examples and do not intend to limit the present invention, application thereof, or the range of the intended use thereof. Configurations in the embodiments, modifications, the other examples, and the like described below can be combined to each other or some of them can be replaced within the range in which the present invention can be embodied.

EMBODIMENTS

An oil separator (40) according to an embodiment is also used for a compressor (10). The compressor (10) is connected to a refrigerant circuit of a refrigeration apparatus. In the refrigerant circuit, a refrigerant compressed in the compressor (10) circulates, and a refrigeration cycle is thereby performed.

Figure 1:
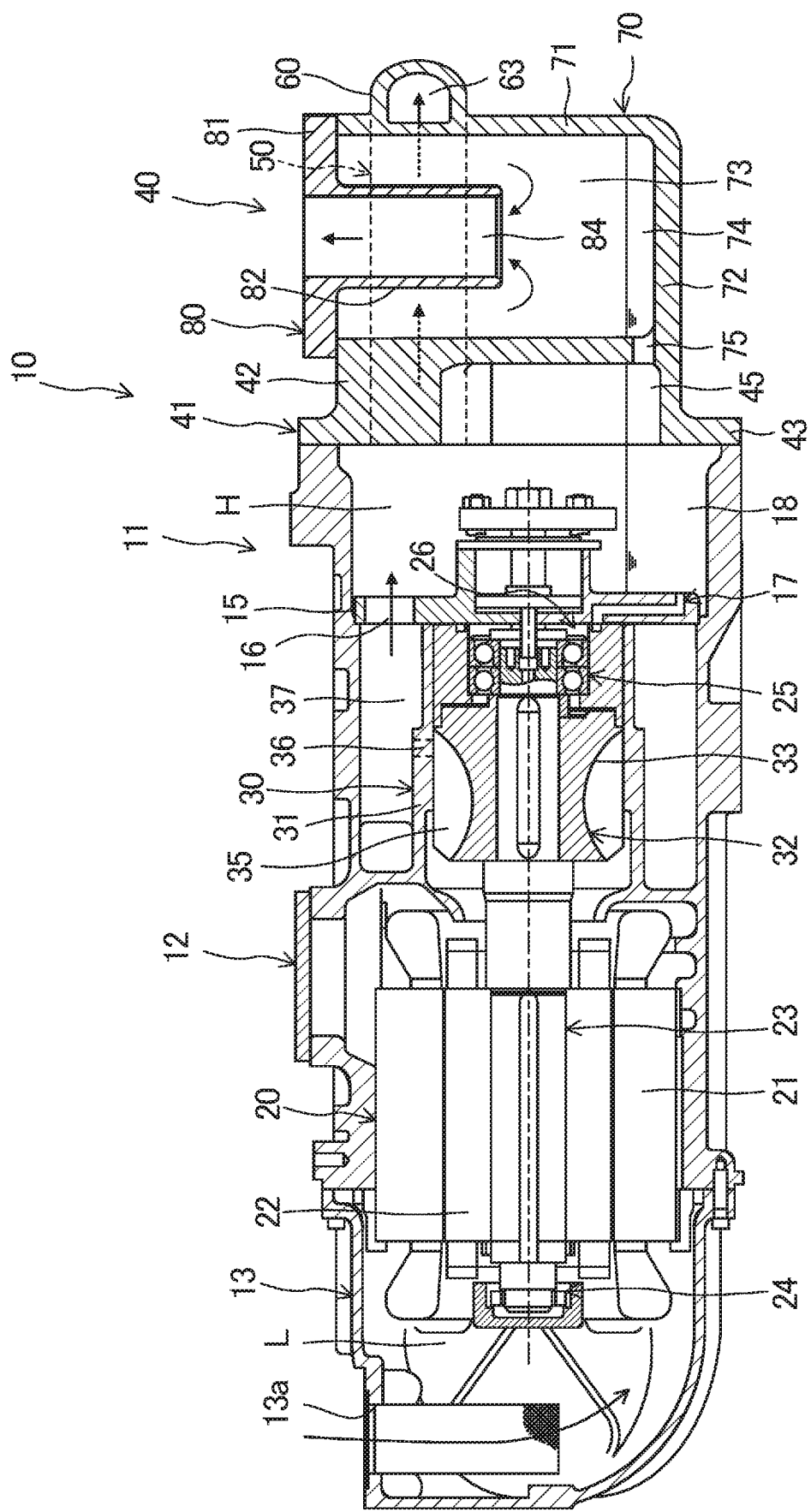
FIG. 1 is a longitudinal sectional view illustrating an overall configuration of a compressor according to an embodiment.

The compressor (10) illustrated in FIG. 1 is a single-screw compressor. The compressor (10) includes a casing (11), an electric motor (20) in the casing (11), a drive shaft (23), and a compression mechanism (30). The compressor (10) includes the oil separator (40). The oil separator (40) is also used as a portion of the casing (11).

<Casing>

The casing (11) is constituted by a laterally elongated metallic semi-hermetic container. The casing (11) includes a casing body (12), an intake cover (13), and a discharge cover (41). The casing body (12) has a laterally elongated cylindrical shape. The intake cover (13) closes an opening at one end in the longitudinal direction (axial direction) of the casing body (12). The discharge cover (41) closes an opening at the other end in the longitudinal direction of the body. Inside the casing (11), a low-pressure space (L) is formed close to the intake cover (13), and a high-pressure space (H) is formed close to the discharge cover (41).

An upper portion of the intake cover (13) includes an intake port (13a). An intake pipe (not illustrated) is connected to the intake port (13a). The intake pipe is connected to the refrigerant circuit. A low-pressure refrigerant is introduced from the intake pipe into the low-pressure space (L)

inside the casing (11). The discharge cover (41) is also used for the oil separator (40). Details of the discharge cover (41) will be described later.

<Electric Motor>

The electric motor (20) is disposed in the low-pressure space (L). The electric motor (20) includes a stator (21) fixed to the casing body (12) and a rotor (22) disposed inside the stator (21). The drive shaft (23) is fixed to a center portion of the rotor (22). The electric motor (20) is configured to be variable in terms of the number of rotations or capacity. In other words, the electric motor (20) is of an inverter type in which electric power is supplied via an inverter device.

<Drive Shaft>

The drive shaft (23) is coupled to the electric motor (20) and the compression mechanism (30). The drive shaft (23) extends horizontally in the longitudinal direction of the casing (11). The drive shaft (23) is rotatably supported by a first bearing (24) and the second bearing (25). The first bearing (24) is disposed inside the intake cover (13). The second bearing (25) is disposed in a bearing chamber (26). The bearing chamber (26) is disposed at the center inside the casing body (12).

<Compression Mechanism>

The compression mechanism (30) is driven by the electric motor (20) via the drive shaft (23). In the compression mechanism (30), a refrigerant is compressed. The compression mechanism (30) includes a cylinder portion (31), a screw rotor (32), and two gate rotors (not illustrated). The cylinder portion (31) is disposed at the center inside the casing body (12). Inside the cylinder portion (31), a slide valve (not illustrated) for performing, an unload operation (operation for returning a portion of the compressed refrigerant into the low-pressure space (L)) is disposed. The screw rotor (32) is accommodated inside the cylinder portion (31). The screw rotor (32) is driven to rotate by the drive shaft (23). The screw rotor (32) includes a helical groove (33) on the circumference thereof. The helical groove (33) meshes with a plurality of gates of the gate rotor. Consequently, a compression chamber (35) is formed between the cylinder portion (31), the screw rotor (32), and the gates. The refrigerant compressed in the compression chamber (35) is discharged through a discharge port (36) into a discharge passage (37) around the cylinder portion (31).

<Partition Wall>

A disc-shaped partition portion (15) is formed between the compression mechanism (30) and the high-pressure space (H). The outer circumferential surface of the partition portion (15) is fixed to the inner circumferential surface of the casing body (12). The partition portion (15) includes a discharge communication hole (16) that enables the discharge passage (37) and the high-pressure space (H) to be in communication with each other. The refrigerant in the discharge passage (37) is sent into the high-pressure space (H) by passing through the discharge communication hole (16).

The partition portion (15) includes an oil introduction path (17). The oil introduction path (17) enables a first oil reservoir (1.8) in a lower portion of the high-pressure space (H) and the bearing chamber (26) to be in communication with each other.

<Overall Configuration of Oil Separator>

Next, the configuration of the oil separator (40) will be described in detail with reference to FIG. 1 to FIG. 8. The oil separator (40) separates an oil from a refrigerant in the high-pressure space (H). The oil separator (40) is of a centrifugal-separation type that utilizes a centrifugal force to separate an oil. Strictly, the oil separator (40) is of a cyclone-type that utilizes a swirling flow generated between an outer cylinder (71) and an inner cylinder (82) to separate an oil in a refrigerant.

The oil separator (40) includes the discharge cover (41), an inflow pipe (50), a separator body (70), and an inner member (80). The discharge cover (41) is also used as a portion of the aforementioned casing (11). The inflow pipe (50) introduces the high-pressure refrigerant in the high-pressure space (H) into the separator body (70). The separator body (70) has a bottomed cylindrical shape. The peripheral wall of the separator body (70) constitutes the outer cylinder (71). The inner member (80) is attached to an upper portion of the separator body (70). The inner member (80) includes a top plate (81) that closes the upper side of the separator body (70) and the inner cylinder (82) disposed inside the separator body (70).

<Discharge Cover>

Figure 2:
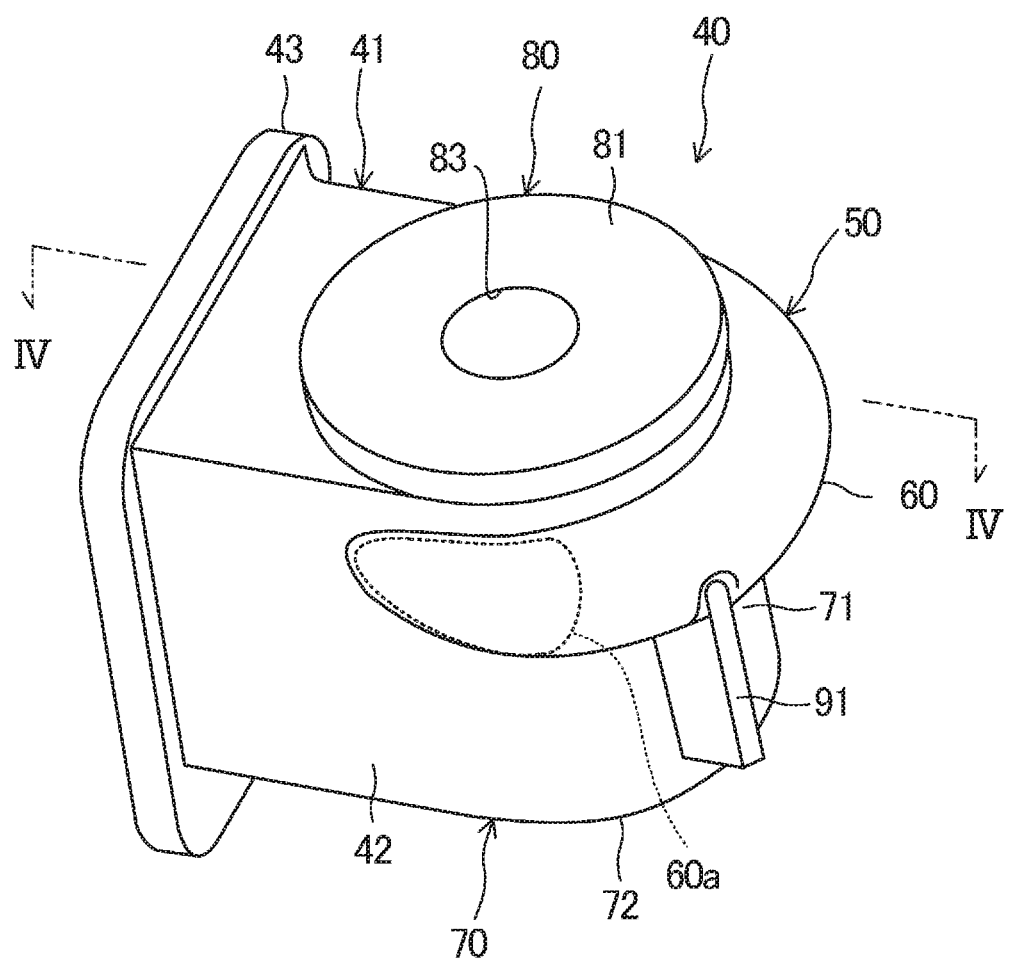
FIG. 2 is a perspective view of an oil separator viewed from the side.
Figure 3:
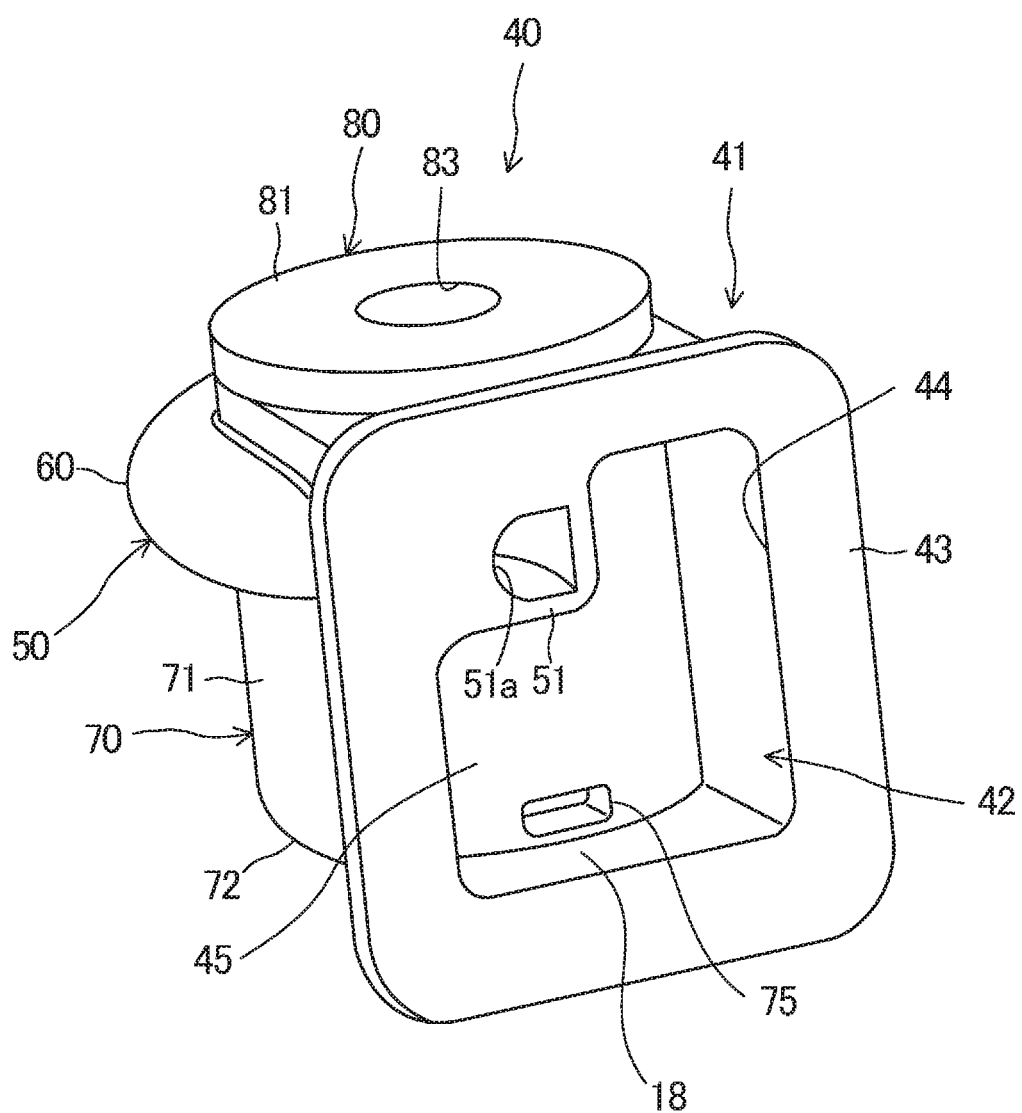
FIG. 3 is a perspective view of the oil separator viewed from a flange-side.

As illustrated in FIG. 2 and FIG. 3, the discharge cover (41) includes a discharge cover body (42) and a flange (43). The discharge cover body (42) has a polygonal-cylinder shape. The discharge cover body (42) includes a cover opening (44) in a side surface thereof facing the casing body (12). A first inner space (45) for separating an oil is formed inside the discharge cover body (42). The first inner space (45) constitutes a portion of the high-pressure space (H). In other words, the first inner space (45) constitutes a portion of the first oil reservoir (18).

The flange (43) projects from the outer edge of the cover opening (44) toward the outer side in the radial direction. The flange (43) has a rectangular-frame shape. The flange (43) is coupled to the casing body (12) via a fastening member (not illustrated). Consequently, the casing body (12) is closed by the discharge cover (41), and the casing (11) is thereby integrally constituted.

<Inflow Pipe>

The inflow pipe (50) is disposed in an upper portion of the separator body (70). More strictly, the height position of the inflow pipe (50) is higher than the lower end of the inner cylinder (82) (refer to FIG. 4), The inflow pipe (50) includes a straight portion (51) and a curved portion (60). The straight portion (51) is formed on the upstream side of the inflow pipe (50), and the curved portion (60) is formed on the downstream side of the inflow pipe (50).

As illustrated in FIG. 3, the straight portion (31) is positioned inside the discharge cover body (42). The straight portion (51) extends horizontally along the axial center of the casing (11). An inflow end (that is, an inflow port (51a) of the inflow pipe (50)) of the straight portion (51) faces the high-pressure space (H). The inflow port (51a) is substantially flush with an end surface of the flange (43).

The curved portion (60) has a function of separating an oil in a refrigerant that has flowed into the inflow pipe (50) by utilizing a centrifugal force. The curved portion (60) of the present embodiment is formed outside the separator body (70). The starting end of the curved portion (60) is continuous with the straight portion (51). The curved portion (60) is curved about the axis of the separator body (70). More strictly, the curved portion (60) is curved from the upstream portion toward the downstream portion thereof in a direction identical to the rotation direction of a swirling flow inside the separator body (70). The curved portion (60) is curved to extend along the outer cylinder (71) of the separator body (70) or to surround the outer cylinder (71). The curved portion (60) is curved to surround the outer cylinder (71) of the separator body (70).

Figure 5:
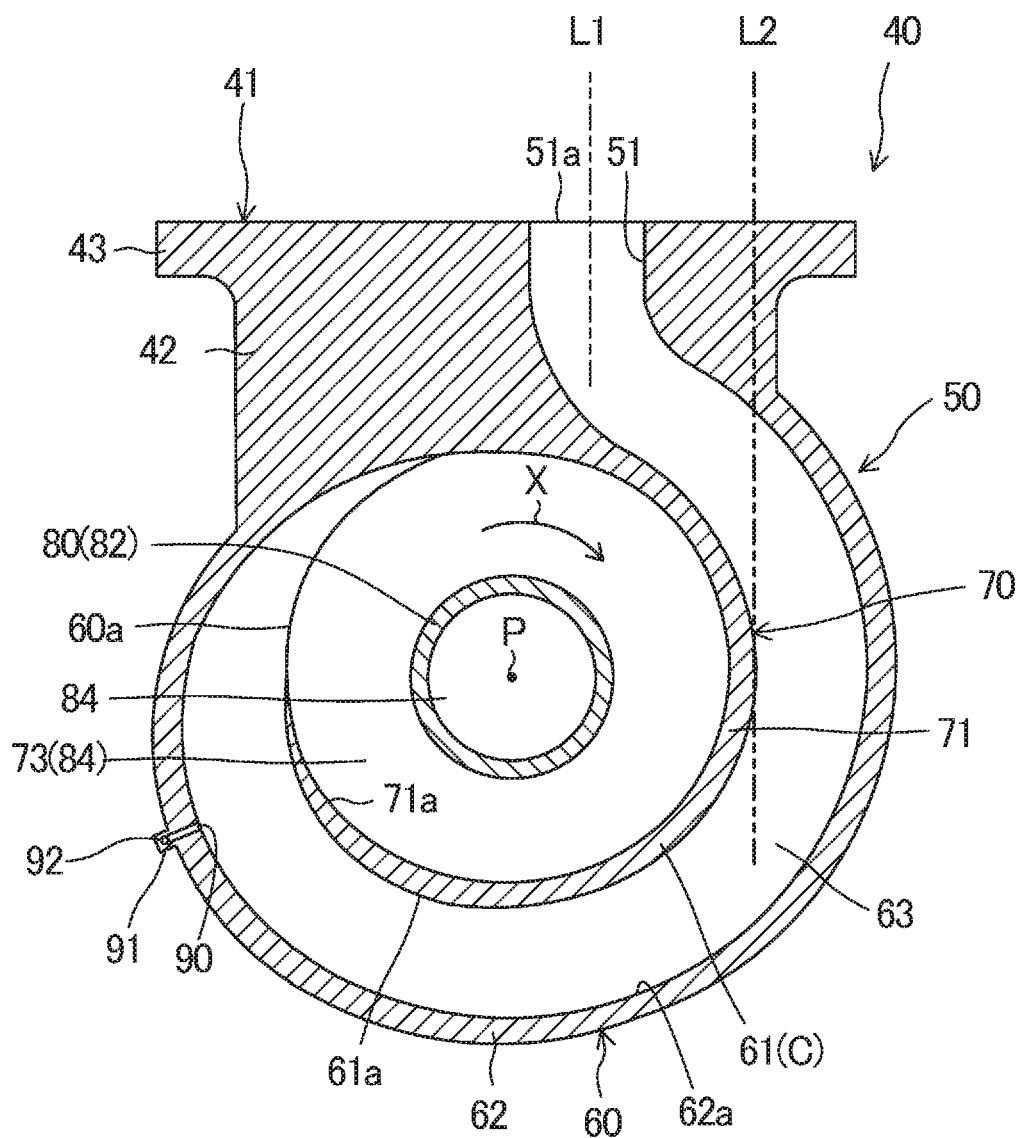
FIG. 5 is a sectional view taken along line V-V of FIG. 4.

As illustrated in FIG. 5, an outflow end (60a) of the curved portion (60) opens in a second inner space (73) of the separator body (70). The outflow end (60a) of the curved portion (60) is directed in a direction along a tangent of the inner circumferential surface of the outer cylinder (71).

As illustrated in FIG. 5, an axis (L1) of the inflow port (51a) of the inflow pipe (50) is offset from a tangent (L2) of the outer circumferential surface of the outer cylinder (71) of the separator body (70) toward a center (P) of the separator body (70).

<Separator Body>

The separator body (70) utilizes a centrifugal force generated by a swirling flow of a refrigerant to separate an oil in the refrigerant. The separator body (70) is a vertically elongated bottomed cylindrical container that opens on the upper side. The separator body (70) includes the aforementioned outer cylinder (71) and a disc-shaped bottom plate (72) (bottom portion) that closes the lower side of the outer cylinder (71). The second inner space (73) is formed inside the separator body (70). A second oil reservoir (74) that stores a separated oil is formed in a lower portion of the second inner space (73).

An oil outlet (75) is formed in a lower end portion of the outer cylinder (71). The oil outlet (75) enables the second inner space (73) (second oil reservoir (74)) and the first inner space (first oil reservoir (18)) to be in communication with each other. Consequently, the oil in the second oil reservoir (74) is enabled to be sent into the first oil reservoir (18) through the oil outlet (75).

<Inner Member>

The inner member (80) includes the aforementioned top plate (81) and the inner cylinder (82).

The top plate (81) has a disc-shape with a circular opening (83) passing therethrough in a plate thickness direction (vertical direction). The outer diameter of the top plate (81) is larger than the inner diameter of the separator body (70). The outer peripheral edge portion of the top plate (81) is fixed to the upper end of the separator body (70). A refrigerant pipe (discharge pipe) of the refrigerant circuit is connected to the circular opening (83) of the top plate (81).

The inner cylinder (82) has a cylindrical shape extending downward from the inner edge of the circular opening (83) of the top plate (81). The inner cylinder (82) is disposed coaxially with the outer cylinder (71). Consequently, a cylindrical space in which a refrigerant swirls about the axis (in the direction indicated by arrow X in FIG. 5) thrilled between the inner cylinder (82) and the outer cylinder (71). An inner passage (84) in which a refrigerant flows upward is formed inside the inner cylinder (82). An inflow port (inner-cylinder inflow port (85)) in communication with the second inner space (73) is formed at the inflow end (lower end) of the inner passage (84). The outflow end (upper end) of the inner passage (84) is in communication with the circular opening (83).

<Details of Curved Portion>

The detailed configuration of the curved portion (60) of the inflow pipe (50) will be described.

Figure 6:
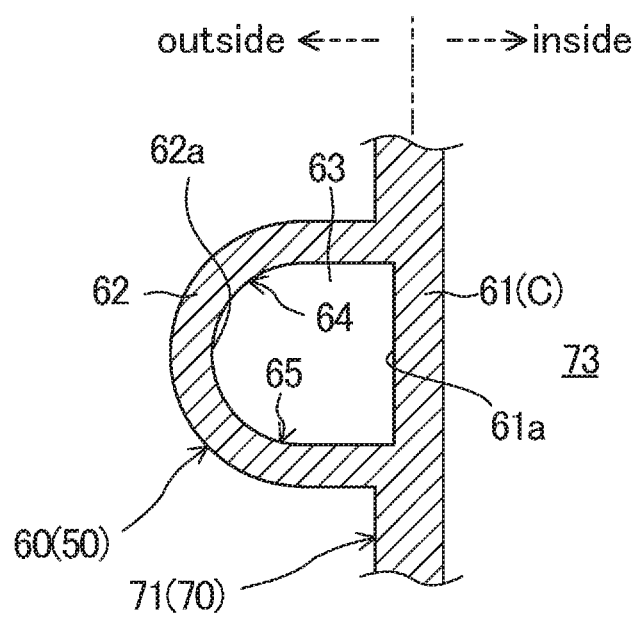
FIG. 6 is a cross sectional view at right angles to the pipe axis of a curved portion.

As illustrated in FIG. 5 and FIG. 6, the curved portion (60) includes a first wall (61) and a second wall (62). The first wall (61) is positioned close to the inner side (close to the separator body (70)), and the second wall (62) is positioned close to the outer side.

The first wall (61) is substantially flush with the outer cylinder (71) of the separator body (70). The first wall (61) and an inner surface (61a) thereof have a flat shape extending vertically in a cross sectional view at right angles to the pipe axis of the inflow pipe (50). The first wall (61) has a substantially arc shape in a cross sectional view at right angles to the pipe axis of the separator body (70). The first wall (61) extends over a range of approximately 180° or more with the axial center of the separator body (70) as a reference.

The first wall (61) is also used as a portion of the outer cylinder (71). Specifically, the peripheral wall (outer cylinder (71)) of the separator body (70) and the first wall (61) of the curved portion (60) constitute a common portion (C). In other words, the first wall (61) constitutes a partition wall between a passage (63) in the curved portion (60) and an inner space (second inner space (73)) of the separator body (70).

The second wall (62) protrudes from the outer cylinder (71) or the first wall (61) toward the outer side in the radial direction. The second wall (62) has a U-shape that opens toward the outer cylinder (71) in the cross sectional view at right angles to the pipe axis of the inflow pipe (50). The second wall (62) has a substantially arc shape in the cross sectional view at right angles to the pipe axis of the separator body (70). The second wall (62) extends over a range of approximately 180° or more with the axial center of the separator body (70) as a reference.

The second wall (62) is a non-common portion not common with the separator body (70). The second wall (62) is positioned outside the separator body (70). Therefore, the second wall (62) constitutes an exposed portion exposed to the outside (atmospheric temperature atmosphere).

As illustrated in FIG. 5, the inner surface of the second wall (62) and the inner surface of the outer cylinder (71) are smoothly continuous with each other. In other words, in the cross sectional view at right angles to the pipe axis of the separator body (70), the second wall (62) and the outer cylinder (71) constitute helical inner walls smoothly continuous with each other. The helical inner walls are wound from the outer end toward the inner end in a direction identical to the direction of a swirling flow of a refrigerant.

<Oil Draining Hole>

Figure 7:
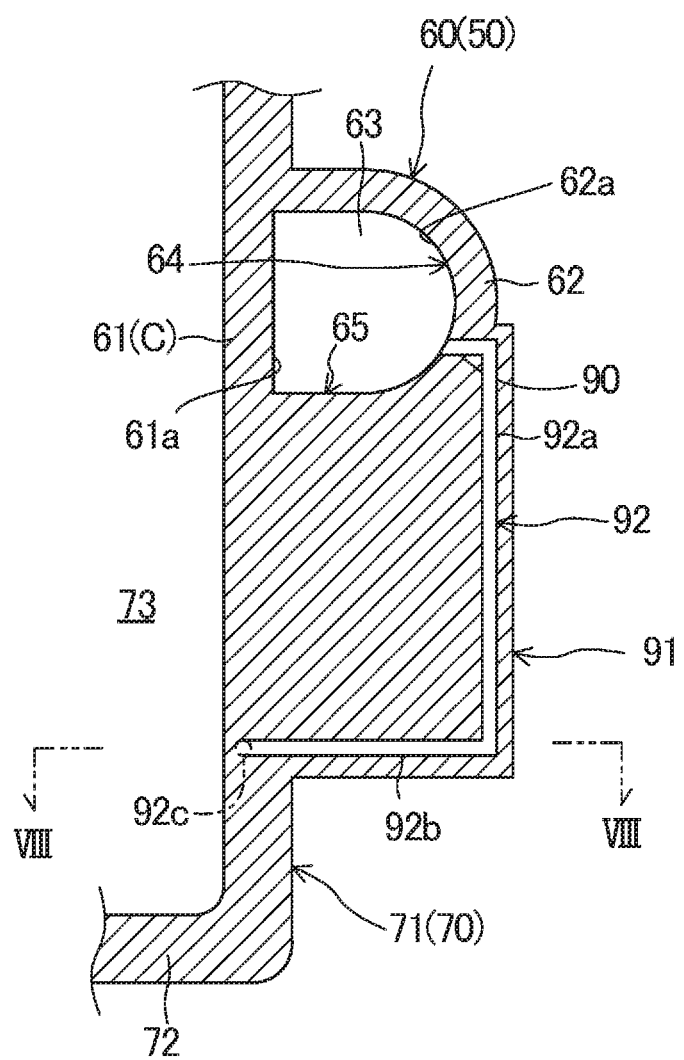
FIG. 7 is an enlarged longitudinal sectional view of a passage member and the periphery thereof.

As illustrated in FIG. 7, the curved portion (60) includes an oil draining hole (90) for discharging an oil accumulated in the passage (63) inside the curved portion (60) to the outside of the curved portion (60). The shape of a cross-section of a flow path of the oil draining hole (90) is, for example, circular. The oil draining hole (90) is formed in an outer circumferential portion (64) of the curved portion (60). Here, the outer circumferential portion (64) is, of the pipe wall of the curved portion (60), a portion facing the axial center of the separator body (70). As illustrated in FIG. 7, the oil draining hole (90) is formed in a lower-side portion (65) of the curved portion (60). Here, the lower-side portion (65) is, of the pipe wall of the curved portion (60), a portion lower than the axial center (a height position at an intermediate portion in the vertical direction) of the passage (63) in the curved portion (60). The oil draining hole (90) is disposed, in the curved portion (60), closer to the downstream end thereof. The oil draining hole (90) opens in a normal direction to be directed to the center of the curvature of the inner circumferential surface of the curved portion (60). The oil draining hole (90) of the present embodiment is constituted by one oil draining hole but may be constituted by two or more oil draining holes.

<Communication Member>

Figure 8:
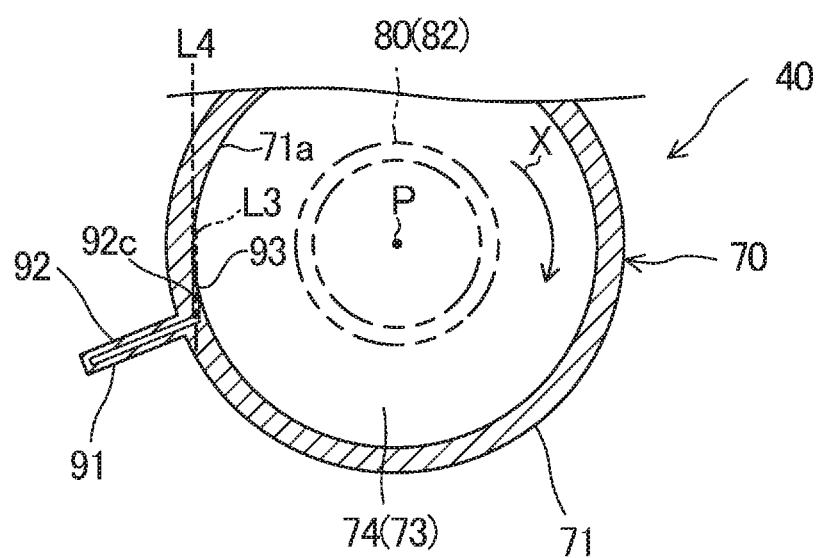
FIG. 8 is a sectional view taken along line VIII-VIII of FIG. 7.

As illustrated in FIG. 2 and FIG. 7, a passage member (91) is disposed at a position corresponding to the oil draining hole (90). The passage member (91) has a vertically elongated parallelepiped or flat-plate shape. An oil passage (92) continuous with the oil draining hole (90) is formed inside the passage member (91). The oil passage (92) enables the oil draining hole (90) of the curved portion (60) and the second inner space (second oil reservoir (74)) of the separator body (70) to be in communication with each other. The oil passage (92) includes a vertically elongated vertical passage (92a), a laterally elongated lateral passage (92b) connected to the lower end of the vertical passage (92a), and an outflow passage (92c) connected to the radial-direction inner end of the lateral passage (92b). As illustrated in FIG. 8, an outflow opening (93) of the oil passage (92) is formed in the outer cylinder (71) of the separator body (70). More specifically, the outflow opening (93) of the oil passage (92) is positioned on the lower side of the inner-cylinder inflow port (85) and on the outer side of the inner-cylinder inflow port (85). An axis (L3) of the outflow opening (93) of the oil passage (92) is directed in a direction along a tangent (L4) of an inner circumferential surface (71a) of the outer cylinder (71). In other words, in the present embodiment, the axis (L3) of the outflow opening (93) is substantially coincident with the tangent (IA) (strictly, the tangent at a location where the outflow opening (93) is formed) of the inner circumferential surface (71a) of the outer cylinder (71).

<Integral Structure of Oil Separator>

In the oil separator (40), the discharge cover (41), the inflow pipe (50), the separator body (70), and the passage member (91) are integrally molded by casting. In other words, the discharge cover (41), the inflow pipe (50), the separator body (70), and the passage member (91) constitute a first unit having an integral structure made of a cast. The inner member (80) is constituted by a second unit that is a different member from the first unit.

Operation of Oil Separator

As illustrated in FIG. 1, during operation of the compressor (10), a refrigerant after being compressed in the compression chamber (35) flows into the inflow pipe (50) from the high-pressure space (H) The refrigerant flows in the curved portion (60) after passing through the straight portion (51). In the curved portion (60), the refrigerant swirls along the curved portion (60). Consequently, small oil droplets in the refrigerant are separated by a centrifugal force.

Figure 4:
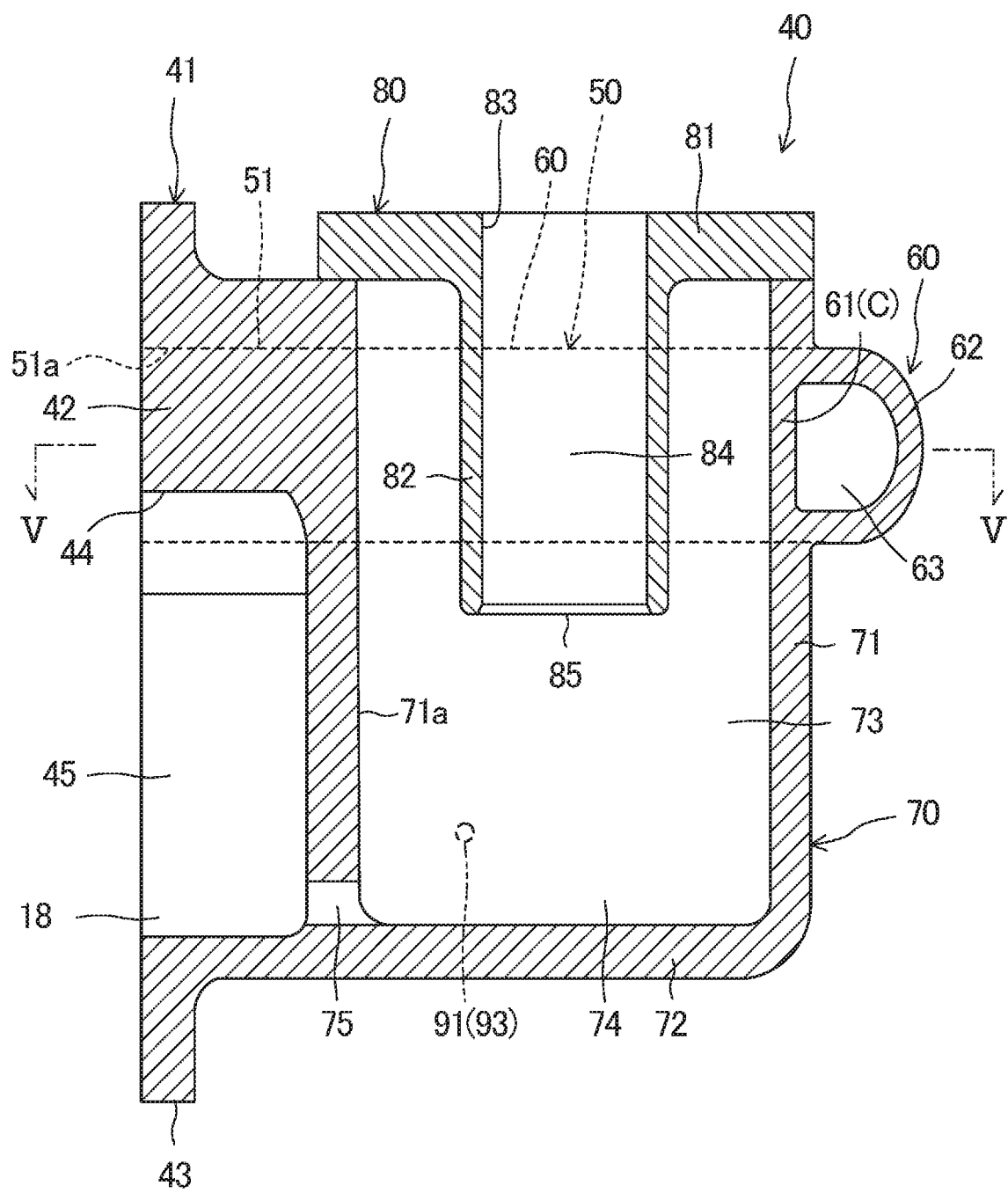
FIG. 4 is an enlarged longitudinal sectional view of the oil separator in FIG. 1.

Here, as illustrated in FIG. 4 and FIG. 6, in the curved portion (60), the first wall (61) faces the second inner space (73) of the separator body (70) while the second wall (62) is exposed to the outside of the separator body (70). A high-temperature refrigerant flows in the second inner space (73) while the outside of the separator body (70) is in the atmospheric temperature atmosphere. Therefore, the second wall (62) has a temperature lower than that of the first wall (61). Oil droplets in the vicinity of the first wall (61) having a comparatively high temperature are thus easily flowable and easily moved by a centrifugal force toward the second wall (62). In contrast, the oil in the vicinity of the second wall (62) having a comparatively low temperature is cooled and is not easily flowable. Consequently, in the curved portion (60), the oil is easily collected at the second wall (62) or the outer circumferential portion (64), and the size of collected oil droplets tends to be large.

The oil whose oil droplets have a size thus increased in the curved portion (60) flows together with the refrigerant into the separator body (70). In the separator body (70), the refrigerant swirls in the second inner space (73). As a result, the oil droplets in the refrigerant are further separated by a centrifugal force. Here, the oil droplets in the refrigerant have a size increased when passing through the aforementioned curved portion (60). As a result, the centrifugal force that acts on the oil droplets increases, which improves oil separation efficiency.

The oil separated in the second inner space (73) is stored in the second oil reservoir (74). The refrigerant from which the oil has been separated flows upward in the inner passage (84) and is sent to the refrigerant circuit through the discharge pipe.

The aforementioned curved portion (60) includes the oil draining hole (90). It is thus possible to send a portion of the oil separated in the curved portion (60) directly into the second oil reservoir (74) through the oil draining hole (90) and the oil passage (92).

The oil draining hole (90) is formed in the outer circumferential portion (64) of the curved portion (60). Here, at the outer circumferential portion (64), the oil droplets moved by the centrifugal force are easily accumulated. The oil collected at the inner wall of the outer circumferential portion (64) is thus easily guided into the oil draining hole (90).

The oil draining hole (90) is formed in the lower-side portion (65) of the curved portion (60). The oil accumulated at the inner wall of the lower-side portion (65) is thus easily guided due to its own weight into the oil draining hole (90).

The outflow opening (93) of the oil passage (92) is formed in the outer cylinder (71). A distance between the outflow opening (93) and the inflow end of the inner passage (84) is thus sufficiently ensured. In addition, as illustrated in FIG. 8, the outflow opening (93) (axis (L3)) opens to be directed in the direction of the tangent (L4) of the outer cylinder (71), and the oil that has flowed out through the outflow opening (93) thus flows along the inner circumferential surface of the outer cylinder (71) into the second inner space (73). As a result, the oil that has flowed into the second inner space (73) from the oil passage (92) is avoided from following the flow of the refrigerant that moves toward the inner passage (84) and being sent together with the refrigerant into the discharge pipe.

The oil in the second oil reservoir (74) is sent into the first oil reservoir (18) through the oil outlet (75). The oil in the first oil reservoir (18) is sent into the bearing chamber (26) through the oil introduction path (17). The oil in the bearing chamber (26) lubricates a slidable portion of the second bearing (25). The oil in the bearing chamber (26) is also supplied to slidable portions of the compression mechanism (30) and the first bearing (24) through a predetermined passage (not illustrated).

Actions/Effects of Embodiment

In the present embodiment, the curved portion (60) includes the oil draining hole (90). Consequently, it is possible to suppress the oil separated in the curved portion (60) from receiving an influence of the flow of a refrigerant and dispersing again.

Specifically, the compressor (10) is adjustable in terms of the number of rotations of the electric motor (20) and, consequently, the circulation amount of the refrigerant. Therefore, for example, when the circulation amount of the refrigerant is changed to increase, the flow rate of the refrigerant flowing in the curved portion (60) also increases. At this time, there is a possibility of small oil droplets dispersing again as a result of the oil adhering to the inner wall of the curved portion (60) being caused to disperse by the refrigerant. In addition, when the oil separated in the curved portion (60) flows together with the refrigerant into the separator body (70), there is a possibility that oil droplets disperses again as a result of the oil being caused to disperse by the refrigerant.

For the above, in the present embodiment, the oil separated in the curved portion (60) is enabled to be discharged to the outside of the curved portion (60) through the oil draining hole (90). Consequently, it is possible to avoid such re-dispersion of oil and improve oil separation efficiency.

In the present embodiment, the oil draining hole (90) is disposed in the outer circumferential portion (64) of the curved portion (60). In the curved portion (60), the oil separated by a centrifugal force easily adheres to the inner wall of the outer circumferential portion (64). Thus, disposing the oil draining hole (90) in the outer circumferential portion (64) causes an oil after being separated to easily flow into the oil draining hole (90).

In the present embodiment, the oil draining hole (90) is disposed in the lower-side portion (65) of the curved portion (60). In the curved portion (60), the oil easily adheres to the inner wall of the lower-side portion (65) due to its own weight of the oil. Thus, disposing the oil draining hole (90) in the lower-side portion (65) causes an oil after being separated to easily flow into the oil draining hole (90).

The present embodiment includes the oil passage (92) that enables the oil draining hole (90) and the second oil reservoir (74) of the separator body (70) to be communication with each other. Consequently, the oil separated in the curved portion (60) is enabled to be collected in the second oil reservoir (74) without dispersing again. In addition, the centrifugal force of the oil can be utilized to carry the oil in the curved portion (60) into the second oil reservoir (74). In addition, due to the distance between the oil draining hole (90) and the second oil reservoir (74) being comparatively short, it is possible to send the oil in the curved portion (60) into the second oil reservoir (74) reliably. Moreover, due to the curved portion (60) positioned higher than the second oil reservoir (74), it is possible to utilize the own weight of the oil to carry the oil in the curved portion (60) into the second oil reservoir (74).

In the present embodiment, the outflow opening (93) of the oil passage (92) is positioned on the lower side of the inner-cylinder inflow port (85) and on the outer side of the inflow port (51a). In addition, the outflow opening (93) of the oil passage (92) is thrilled in the outer cylinder (71). Due to these configurations, it is possible to increase the distance between the outflow opening (93) of the oil passage (92) and the inner-cylinder inflow port (85). Accordingly, it is possible to avoid the oil that has flowed out through the outflow opening (93) of the oil passage (92) from dispersing again and flowing into the inner-cylinder inflow port (85) due to the influence of the flow of a refrigerant that flows into the inner-cylinder inflow port (85).

In the present embodiment, the outflow opening (93) of the oil passage (92) opens in a direction along the tangent of the inner circumferential surface (71a) of the separator body (70). It is thus possible to more reliably avoid the oil that has flowed out through the outflow opening (93) of the oil passage (92) from dispersing again and flowing into the inner-cylinder inflow port (85) due to the influence of the flow of the refrigerant that flows into the inner-cylinder inflow port (85).

In the present embodiment, the oil that has flowed into the oil draining hole (90) flows through the second oil reservoir (74), the first oil reservoir (18), the oil introduction path (17), and the bearing chamber (26), sequentially, and is supplied to the bearings (24, 25) and the compression mechanism (30). It is thus possible to utilize the oil separated in the curved portion (60) for lubrication of the slidable portions thereof.

Modifications of Embodiment

The aforementioned embodiment may be configured into following modifications.

<First Modification>

Figure 9:
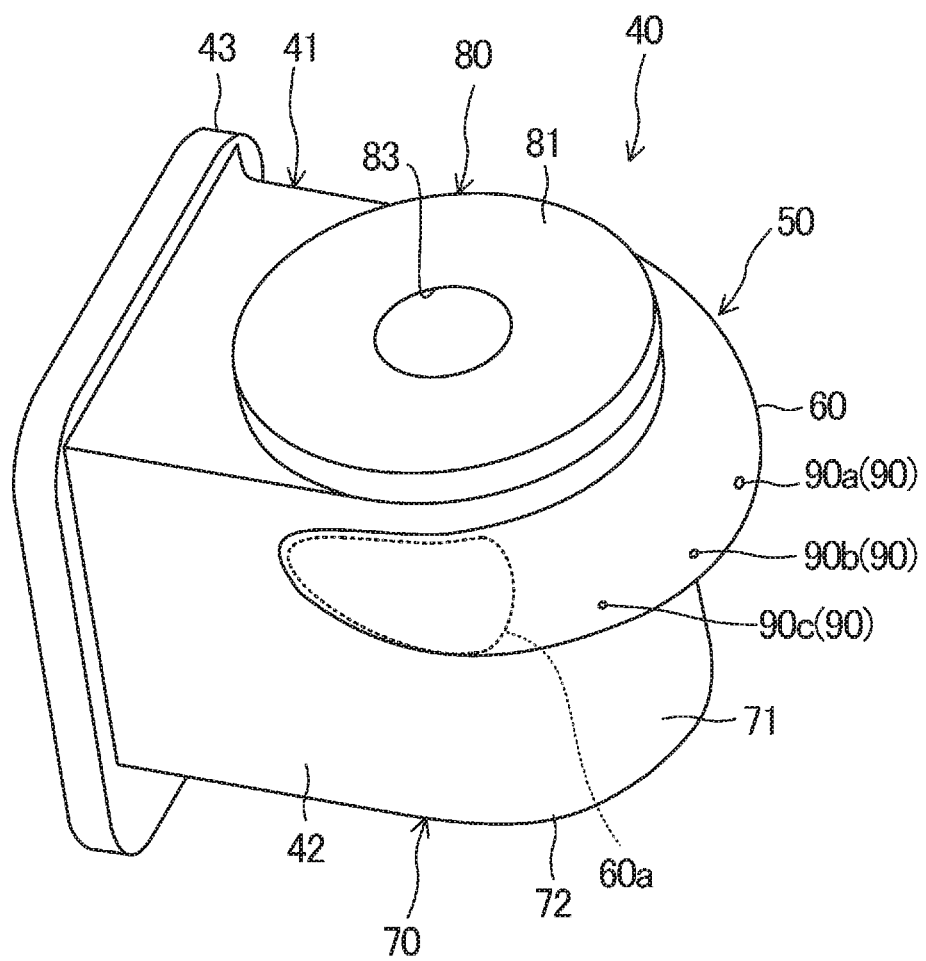
FIG. 9 is a view of the oil separator according to a first modification and corresponds to FIG. 2.

A first modification illustrated in FIG. 9 includes a plurality (three in this modification) of the oil draining holes (90) formed in the curved portion (60). These oil draining holes (90) are arrayed in the flowing direction of a refrigerant. In detail, these oil draining holes (90) are constituted by a first oil draining hole (90a), a second oil draining hole (90b), and third oil draining hole (90c) in the order from the upstream side toward the downstream side. In the curved portion (60) of the first modification, the height positions (angular position about the axis) of the oil draining holes (90) are equal to each other.

In the first modification, the opening areas of the plurality of oil draining holes (90) become smaller toward the downstream side. Specifically, when the opening area of the first oil draining hole (90a) is represented by A1, the opening area of the second oil draining hole (90b) is represented by A2, and the opening area of the third oil draining hole (90c) is represented by A3, the relation of A1>A2>A3 is satisfied. An oil passage (not illustrated) is connected to each of the oil draining holes (90).

In the present modification, the plurality of oil draining holes (90) are disposed in the flowing direction of a refrigerant in the curved portion (60). It is thus possible to increase the amount of an oil to be introduced from the curved portion (60) into the oil draining hole (90) and reliably suppress re-dispersion of the oil.

In the first modification, the opening areas of the plurality of oil draining holes (90) become smaller toward the downstream side. Here, in the curved portion (60), the amount of the separated oil tends to be large on the upstream side thereof, compared with the downstream side. The opening area of the oil draining holes (90) of the first modification corresponds to the amount or size of an oil to be separated. Thus, for example, the first oil draining hole (90a) enables a comparatively large amount of an oil to be reliably discharged. Moreover, for example, the third oil draining hole (90c) is avoided from having an excessively large opening area. Accordingly, for example, a refrigerant is avoided from flowing out through the third oil draining hole (90c) to the outside of the curved portion (60).

<Second Modification>

Figure 10:
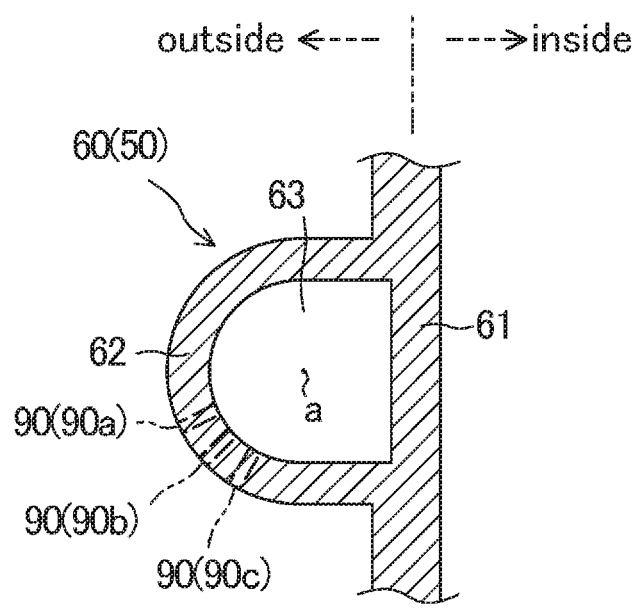
FIG. 10 is a cross sectional view at right angles to the pipe axis of the curved portion according to a second modification with oil draining holes indicated by virtual lines.

According to a second modification illustrated in FIG. 10, the oil draining holes (90) differ from each other in terms of an angular position about the axis in the configuration including the plurality of oil draining holes (90) in the curved portion (60). Specifically, the curved portion (60) includes the first oil draining hole (90a), the second oil draining hole (90b), and the third oil draining hole (90c) that are arrayed in the flowing direction of a refrigerant. The sizes of these oil draining holes (90) are set to be, for example, identical to each other. In contrast, the angular positions of these oil draining holes (90) in the circumferential direction with the axial center (dot a in FIG. 10) of the curved portion (60) as a reference are deviated from each other in the cross sectional view at right angles to the pipe axis. An oil passage (not illustrated) is connected to each of the oil draining hole (90).

In the present modification, the plurality of oil draining holes (90) differ from each other in terms of an angular position about the axis of the inflow pipe (50). In the curved portion (60), the separated oil is sometimes distributed widely in the circumferential direction of the inner wall. For the above, the thus deviated angular positions of the plurality of oil draining holes (90) enable such an oil to be caught in any of the oil draining hole (90).

<Third Modification>

Figure 11:
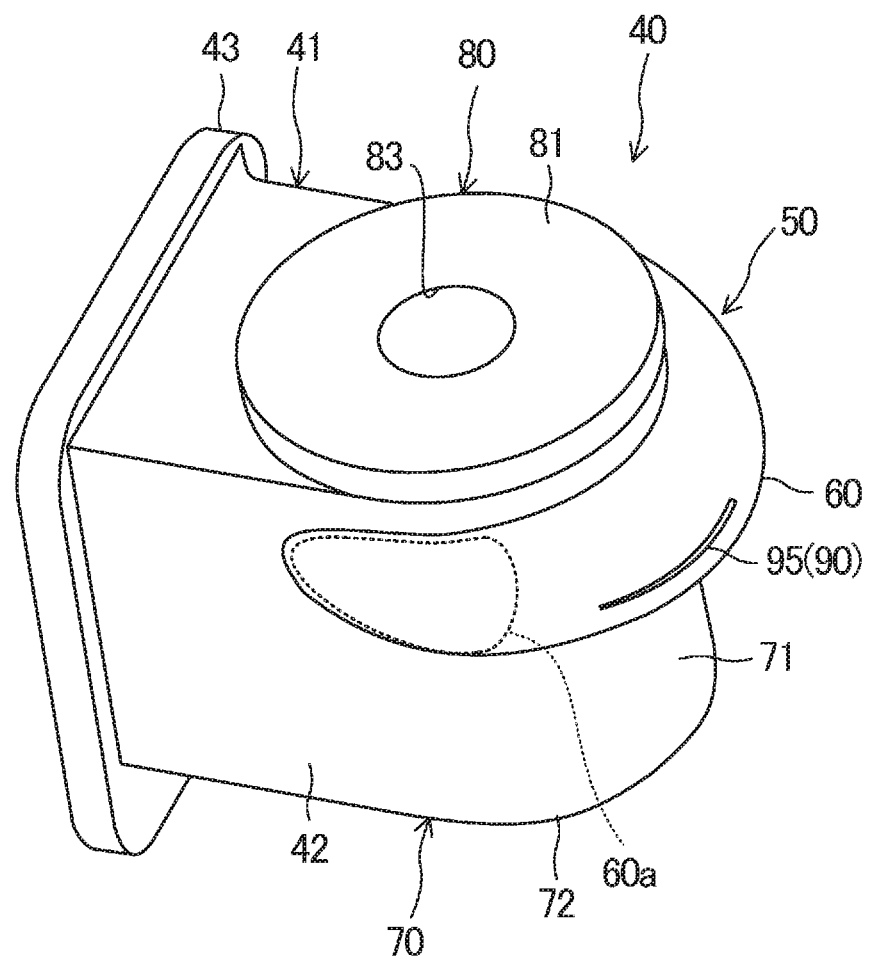
FIG. 11 is a view of the oil separator according to a third modification and corresponds to FIG. 2.

In a third modification illustrated in FIG. 11, the oil draining hole (90) of the curved portion (60) is constituted by a slit (95). The slit (95) extend in the flowing direction of a refrigerant. The slit (95) is preferably disposed so as to be in the outer circumferential portion (64) of the curved portion (60) and in the lower-side portion (65). The slit (95) of the third modification has an opening width (width in the circumferential direction of the curved portion (60)) that decreases toward the downstream side. An oil passage (not illustrated) is connected to the slit (95).

In the present modification, the opening width of the slit (95) decreases toward the downstream side. In other words, in the third modification, the opening width of the slit (95) corresponds to the amount or the size of an oil to be separated. Thus, for example, an upstream portion of the slit (95) enables a comparatively large amount of an oil to be reliably discharged. Moreover, for example, a downstream portion of the slit (95) is avoided from having an excessively large opening width. Accordingly, for example, a refrigerant is avoided from flowing out through the downstream portion of the slit (95) to the outside of the curved portion (60).

<Fourth Modification>

Figure 12:
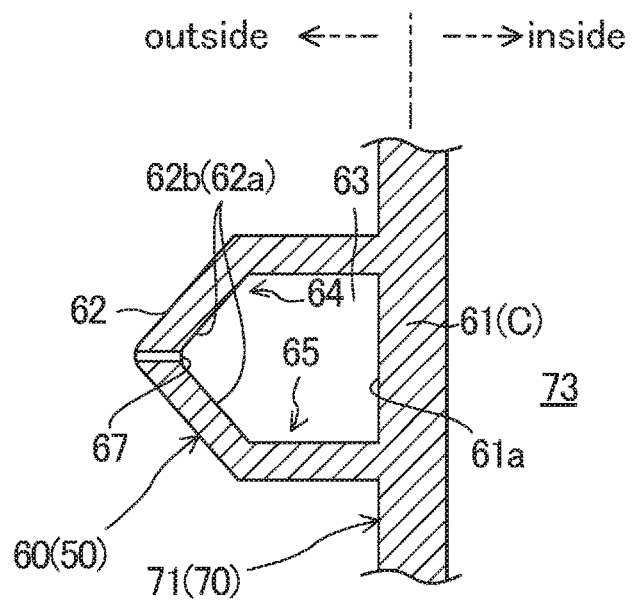
FIG. 12 is a view of the curved portion according to a fourth modification and corresponds to FIG. 6.

A fourth modification illustrated in FIG. 12 differs from the aforementioned embodiment in terms of the shape of the second wall (62). The second wall (62) of the fourth modification has an inner surface (62a) having a shape tapered toward the outer side in the radial direction in the cross sectional view at right angles to the pipe axis. Specifically, the curved portion (60) of the fourth modification has a polygonal (pentagonal in the present modification) sectional shape. The second wall (62) has two surfaces (62b, 62b) close to the outer side, and the interval between the two surfaces decreases toward the outer side in the radial direction. Consequently, the second wall (62) includes, in a portion corresponding to the front end on the outer side in the radial direction, a groove (67) that catches an oil.

In the present modification, the oil draining hole (90) is disposed in a front d portion (that is, the bottom portion of the groove (67)) corresponding to the front end of the inner surface (61a) of the curved portion (60). It is thus possible to easily guide the oil flowing in the groove (67) into the oil draining hole (90).

<Fifth Modification>

Figure 13:
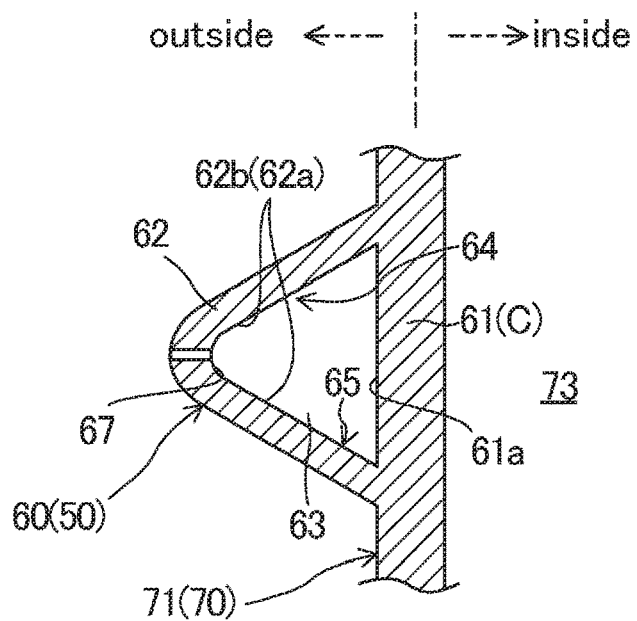
FIG. 13 is a view of the curved portion according to a fifth modification and corresponds to FIG. 6.

The curved portion (60) of a fifth modification illustrated in FIG. 13 has a triangular sectional shape tapered toward the outer side in the radial direction. The curved portion (60) includes the groove (67) at the front end on the outer side in the radial direction thereof, and the oil draining hole (90) is formed in the bottom portion of the groove (67). The fifth modification also provides the same actions and effects as those in the fourth modification.

<Sixth Modification>

Figure 14:
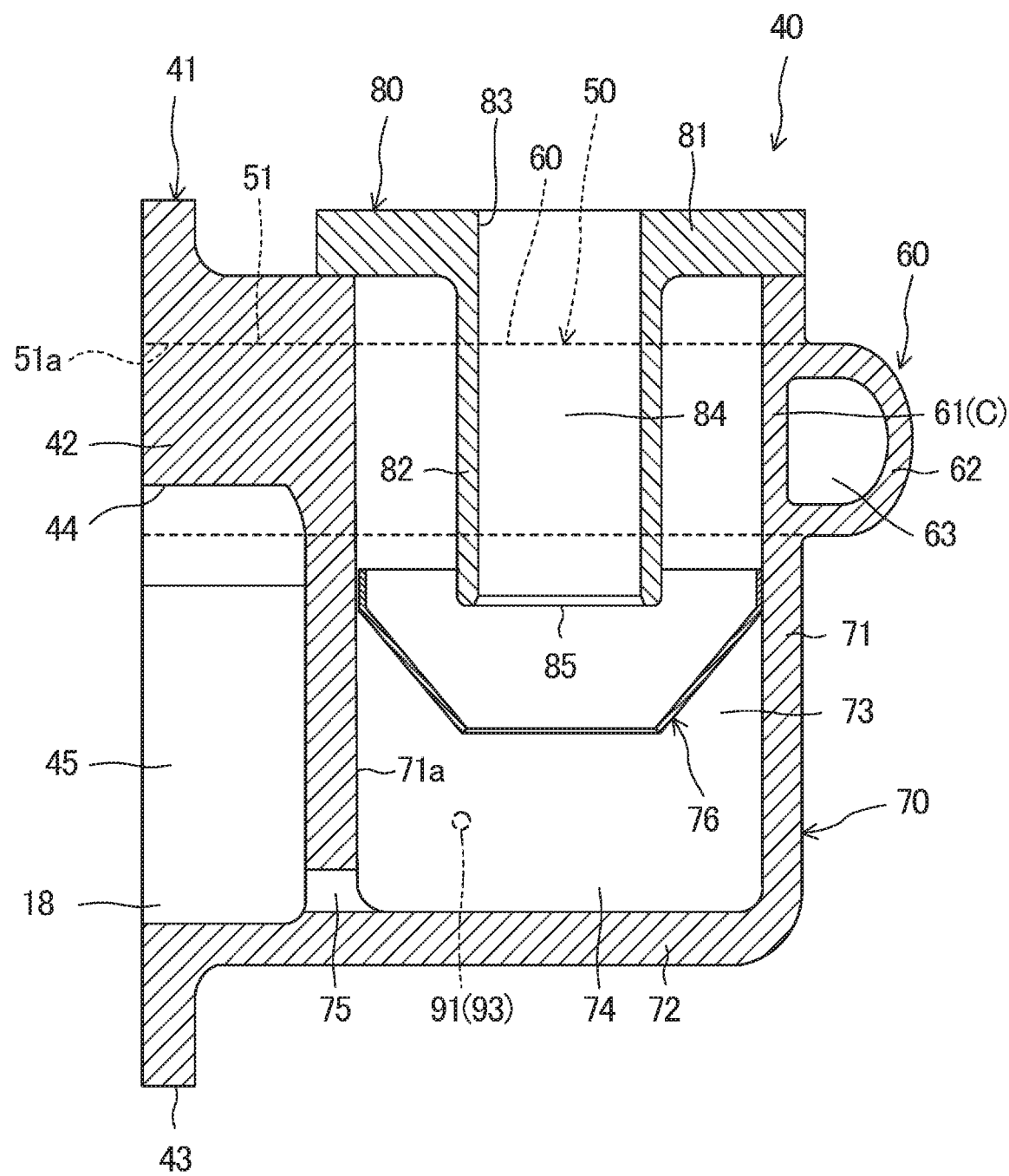
FIG. 14 is a view of the oil separator according to a sixth modification and corresponds to FIG. 4.

A sixth modification illustrated in FIG. 14 includes a separation plate (76) inside the separator body (70). The separation plate (76) has a substantially conical cylindrical shape having an inner diameter that decreases toward the lower side. The upper end of the separation plate (76) is supported by the outer cylinder (71). The lower end of the separation plate (76) has a circular opening. The separation plate (76) suppresses the oil in the second oil reservoir (74) from flowing into the inner cylinder (82).

In the present modification, the outflow opening (93) of the oil passage (92) is positioned on the lower side of the separation plate (76). The oil that has flowed out through the outflow opening (93) of the oil passage (92) is enabled to be suppressed by the separation plate (76) from dispersing again and flowing into the inner-cylinder inflow port (85) due to the influence of the flow of the refrigerant that flows into the inner-cylinder inflow port (85).

<Seventh Modification>

Figure 15:
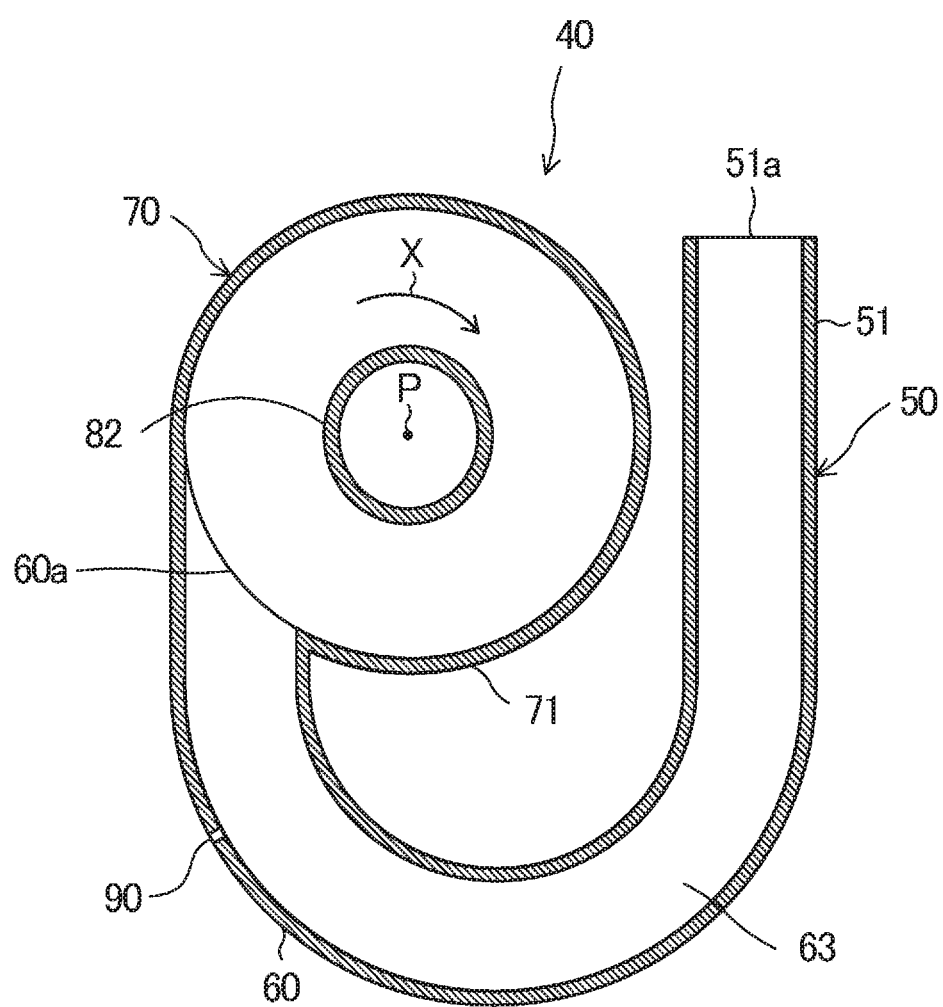
FIG. 15 is a transverse sectional view of the oil separator according to a seventh modification.

In the fifth modification illustrated in FIG. 15, the inflow pipe (50) and the separator body (70) are not integrally formed but are constituted by different members. As with the aforementioned embodiment, the curved portion (60) of the inflow pipe (50) includes the oil draining hole (90). An oil passage (not illustrated) is connected to the oil draining hole (90).

<Eighth Modification>

Figure 16:
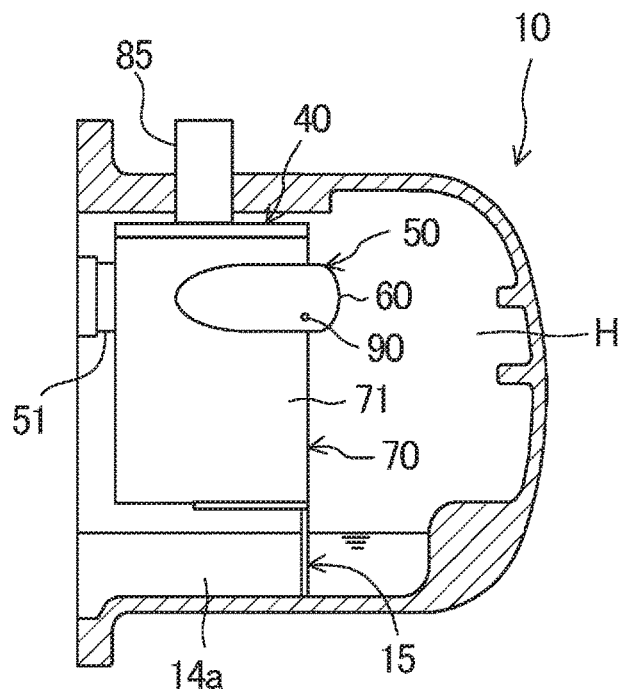
FIG. 16 is a longitudinal sectional view of the compressor according to an eighth modification with the periphery of the oil separator enlarged.

In an eighth modification illustrated in FIG. 16, the oil separator (40) is accommodated inside the casing (11) of the compressor (10). The oil separator (40) is accommodated inside the discharge cover (14) of the casing (11). The discharge cover (14) is configured to be a different body from the oil separator (40) and closes a high-pressure-side opening portion of the aforementioned casing body (11). Inside the discharge cover (14), the high-pressure space (H) filled with a high-pressure refrigerant is formed. An oil reservoir (14a) is formed on the lower side of the discharge cover (14).

The oil separator (40) is supported on the upper side of the oil reservoir (14a) by, for example, a support (15). As with the aforementioned embodiments, the high-pressure refrigerant compressed in the compression mechanism (30) flows into the separator body (70) after flowing through the curved portion (60) of the inflow pipe (50). The fluid inside the separator body (70) is sent to the refrigerant circuit through a discharge pipe (85).

In the eighth modification, as with the aforementioned embodiment, the curved portion (60) includes the oil draining hole (90). The oil draining hole (90) enables the inside of the curved portion (60) and the outside of the curved portion (60) to be directly in communication with each other. Thus, the oil that has flowed out through the oil draining hole (90) of the curved portion (60) drops downward due to its own weight and is collected directly in the oil reservoir (14a). As with the aforementioned embodiment, the oil in the oil reservoir (14a) is utilized, via a predetermined oil introduction path, for lubrication of the compression mechanism (30) and the bearings (24, 25). The oil draining hole (90) of the curved portion (60) may employ any of the configurations of the aforementioned embodiments.

OTHER EMBODIMENTS

Figure 17:
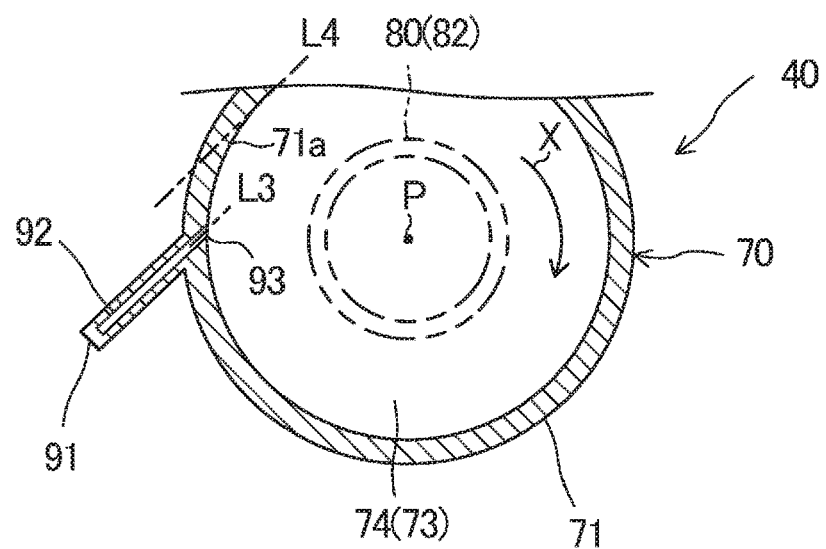
FIG. 17 is a view of the other embodiment and corresponds to FIG. 8.

As illustrated in FIG. 17, the axis (L3) of the outflow opening (93) of the oil passage (92) is not limited to being coincident with the tangent (L4) of the inner circumferential surface (71a) of the outer cylinder (71). Specifically, while the outflow opening (93) opens in the direction along the tangent (L4), the axis (L3) may be offset from the tangent (L4) toward the center (P). The outflow opening (93) may open in the normal direction to be directed to the center (P).

As long as being of a centrifugal type that separates an oil inside the separator body (70) by utilizing a centrifugal force, the oil separator (40) may have any configurations and may be configured not to include the inner cylinder (82).

The oil collected in the second oil reservoir (74) may be sent directly into the bearing chamber (26) or may be supplied to the slidable portions of the compression mechanism (30) and the like without passing through the hearing chamber (26). The oil in the second oil reservoir (74) may be returned in the middle of compression (intermediate pressure part) of the compression chamber (35).

Similarly, the oil drained through the oil draining hole (90) may be sent directly into the bearing chamber (26) or may be supplied to the slidable portions of the compression mechanism (30) and the like without passing through the bearing chamber (26). The oil drained through the oil draining hole (90) may be returned in the middle of compression (intermediate pressure part) of the compression chamber (35).

The compressor (10) may be a twin-screw compressor including two screws or may be a one-gate-type single-screw compressor including one gate rotor.

The compressor (10) may employ, as an alternative to a screw type, other types, such as a rotary type, a swing type, a scroll type, and a turbo type.

The refrigeration apparatus may be an air-conditioning apparatus that performs indoor air-conditioning, a cooler that cools air in a storage chamber, a heat pump-type hot water heater, and the like.

The oil separator (40) may be applied to apparatuses other than the compressor (10) and a refrigeration apparatus provided that the use thereof is to separate an oil from a fluid.

INDUSTRIAL APPLICABILITY

The present invention is useful for an oil separator of a centrifugal type.

What is claimed is:

1. An oil separator, the oil separator being a centrifugal-separation type, the oil separator comprising:
   a cylindrical separator body; and
   an inflow pipe arranged to introduce a fluid including an oil into the separator body, the inflow pipe including a curved portion,
   the curved portion including at least one oil draining hole.

2. The oil separator according to claim 1, wherein
   the oil draining hole is disposed in an outer circumferential portion of the curved portion.

3. The oil separator according to claim 1, wherein
   the oil draining hole is disposed in a lower-side portion on a lower side of an axial center of the curved portion.

4. The oil separator according to claim 1, wherein
   the curved portion includes a plurality of oil draining holes arrayed in a flowing direction of the fluid.

5. The oil separator according to claim 4, wherein
   opening areas of the plurality of oil draining holes become smaller toward a downstream side.

6. The oil separator according to claim 4, wherein
   the plurality of oil draining holes differ from each other in terms of an angular position about an axis of the inflow pipe.

7. The oil separator according to claim 1, wherein
   the oil draining hole is a slit extending in a flowing direction of the fluid.

8. The oil separator according to claim 7, wherein
   an opening width of the slit decreases toward a downstream side.

9. The oil separator according to claim 1, wherein
   the curved portion has an inner surface having a shape tapered toward an outer side in a radial direction, and
   the oil draining hole is disposed in a front end portion of the inner surface.

10. The oil separator according to claim 1, further comprising:
    an oil passage arranged to enable the oil draining hole and an oil reservoir of the separator body to be in communication with each other.

11. The oil separator according to claim 10, further comprising:
    an inner cylinder disposed at a center inside the separator body, the inner cylinder having a lower end that includes an inflow port for the fluid,
    an outflow opening of the oil passage being positioned
       on a lower side of the inflow port of the inner cylinder and
       on an outer side of the inflow port.

12. The oil separator according to claim 10, further comprising:
    an inner cylinder disposed at a center inside the separator body, the inner cylinder having a lower end that includes an inflow port for the fluid; and
    a separation plate disposed between a bottom portion of the separator body and the inner cylinder,
    an outflow opening of the oil passage being positioned on a lower side of the separation plate.

13. The oil separator according to claim 10, wherein
    an outflow opening of the oil passage is disposed in a peripheral wall of the separator body.

14. The oil separator according to claim 10, wherein
    an outflow opening of the oil passage opens in a direction along a tangent of an inner circumferential surface of the separator body.

15. A compressor including the oil separator according to claim 1, the compressor further comprising:
    an electric motor;
    a drive shaft configured to be driven to rotate by the electric motor;
    a bearing that supports the drivee shaft; and
    a compression mechanism coupled to the drive shaft, the compression mechanism being configured to compress a fluid.

16. The compressor according to claim 15, further comprising:
    an oil introduction path arranged to send an oil that has flowed out through the oil draining hole to at least one of a slidable portion of the compression mechanism and the bearing.

* * * * *